Nov. 23, 1965   E. J. DE HOFF   3,218,883
FOOT OPERATED HAND RELEASE PARKING BRAKE ASSEMBLY
Filed Feb. 27, 1964   2 Sheets-Sheet 1
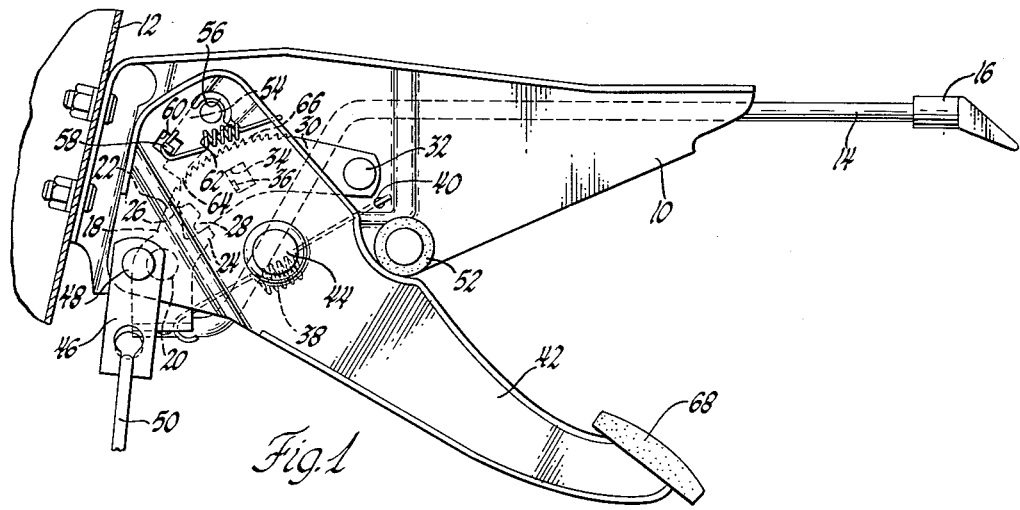
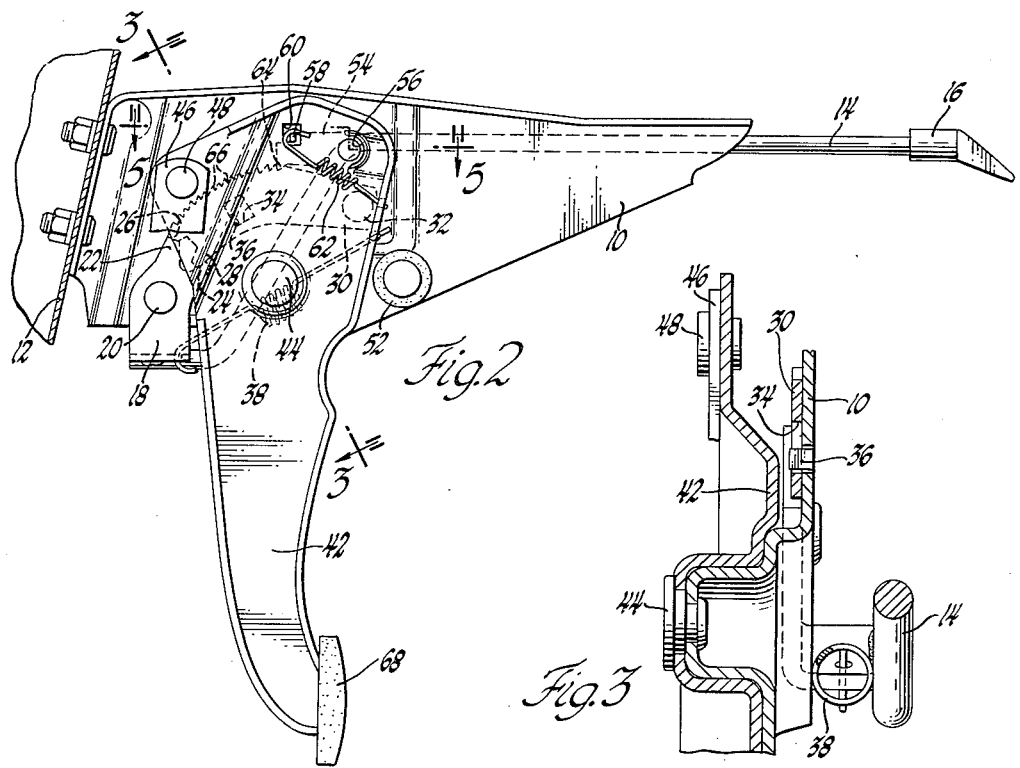
INVENTOR.
Edward J. DeHoff
BY
D.D. McGraw
HIS ATTORNEY Nov. 23, 1965  E. J. DE HOFF  3,218,883
FOOT OPERATED HAND RELEASE PARKING BRAKE ASSEMBLY
Filed Feb. 27, 1964  2 Sheets-Sheet 2

INVENTOR.
Edward J. De Hoff
BY
D. D. McGraw
HIS ATTORNEY

United States Patent Office 3,218,883
Patented Nov. 23, 1965

3,218,883
FOOT OPERATED HAND RELEASE PARKING BRAKE ASSEMBLY
Edward J. De Hoff, Dayton, Ohio, assignor to General Motors Corporation, Detroit, Mich., a corporation of Delaware
Filed Feb. 27, 1964, Ser. No. 347,722
5 Claims. (Cl. 74—534)

This invention relates to parking brake assemblies and more particularly to an improved vehicle parking brake which is unlocked by a pivotable hand lever positively driving a locking ratchet to a released position.

It is desirable in the manufacture of automobiles to have an emergency or parking brake which is actuatable by a lever upon which great force can be exerted, for example, a foot pedal. It is likewise desirable to have such a parking brake releasable by a hand lever which is conveniently placed within the driving compartment of the vehicle. Foot operated parking brakes with hand release levers are old in the art but this invention provides an improved hand release lever actuated mechanism which positively positions a locking ratchet sector to a released position irrespective of the amount of holding force on the ratchet.

It is an object of the present invention to provide an improved parking brake assembly that is foot operated and released by a pivotable hand lever.

It is another object of the present invention to provide an improved foot operated parking brake with a releasing hand lever which actuates mechanism that positively drives portions of the parking brake assembly to the released position.

It is also an object of the present invention to provide an improved foot operated parking brake with mechanism actuated by a hand releasing lever which positively drives portions of the parking brake assembly to the released position and is powered to positively drive portions of the parking brake assembly from the positive released position to a positive holding position to permit holding the parking brake in an actuated position.

It is still another object of the present invention to provide an improved parking brake assembly for a vehicle that is simple to operate and is not radically different from existing designs.

It is a further object of the present invention to provide an improved parking brake assembly wherein a foot actuated pedal provides a mechanical advantage for the operation thereof and a hand release lever positively disengages the holding mechanism from the foot pedal regardless of the amount of holding force on the foot pedal.

Further objects and advantages of the present invention will be apparent from the following description, reference being had to the accompanying drawings wherein a preferred embodiment of the present invention is clearly shown.

In the drawings:

FIGURE 1 is an elevational view of the subject device, the device shown in the released position;

FIGURE 2 is an elevational view of the subject device, the device being illustrated in the actuated position;

FIGURE 3 is a sectional view taken along line 3—3 of FIGURE 2;

Figure 4:
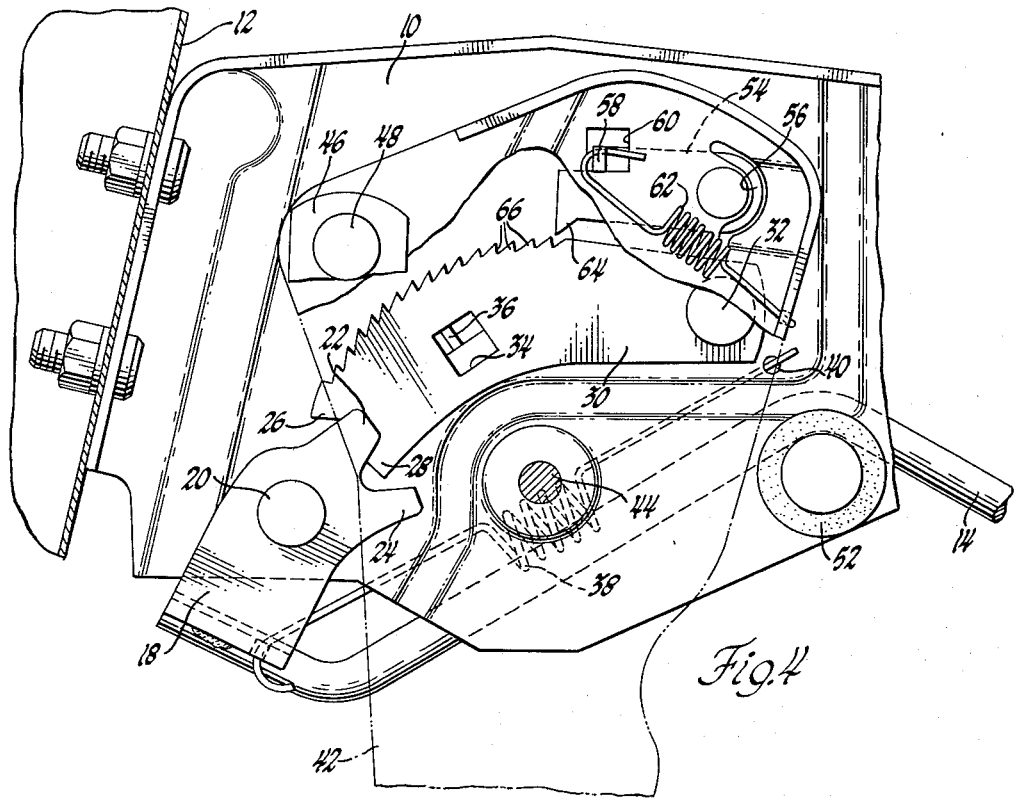
FIGURE 4 is an enlarged partial elevational view of the locking and unlocking mechanism of the subject device.
Figure 5:
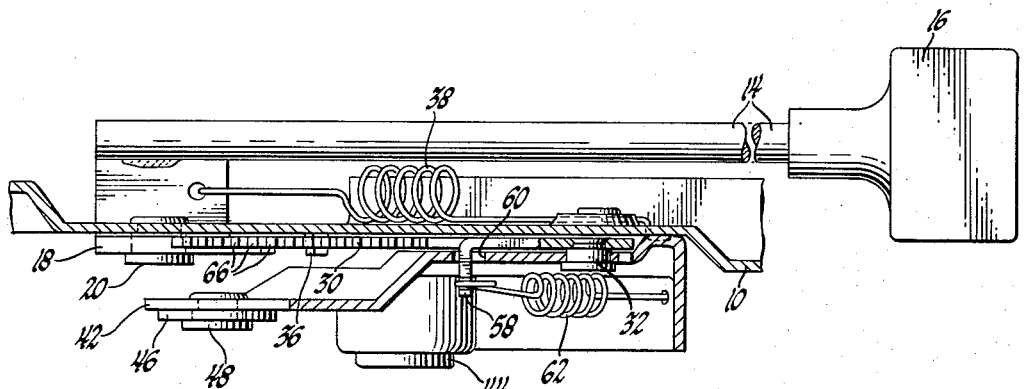
FIGURE 5 is a sectional view taken along 5—5 of FIGURE 2.

Referring now to FIGURE 1, a mounting bracket 10 is secured to a fire wall 12 of a vehicle so that a release rod assembly 14 has a knob 16 available to the vehicle operator. The assembly 14 includes a ratchet release or lever 18 which is pivoted on a rivet 20 to the bracket 10. The ratchet release 18 has angularly spaced teeth 22 and 24 which are engageable with mating teeth 26 and 28 formed on a ratchet 30. The ratchet 30 is pivotally attached at point 32 to the mounting bracket 10. The ratchet 30 has an aperture 34 through which a tang 36, formed on the mounting bracket 10, extends to limit the pivoting movement of the ratchet 30. A ratchet spring 38 is attached to the ratchet release 18 at one end and to the mounting bracket 10 through aperture 40 at the other end so that the assembly 14 is constantly urged upwardly and ratchet release 18 is urged counterclockwise to position teeth 22 and 26 in end engaging relation. The ratchet tooth 28 then extends between teeth 22 and 24 of the ratchet release 18 as illustrated in FIGURES 1 and 3. The cooperation of the teeth 22 through 28 can be likened to a drive cam and cam follower arrangement wherein teeth 22 and 24 are drive cams and teeth 26 and 28 are cam followers.

A pedal arm or actuator lever 42 is pivoted at point 44 to the bracket 10. A clevis 46 is pivoted at point 48 to the arm 42 and a parking brake cable 50 has one end attached to the clevis in any well-known manner. The other end of parking brake cable 50 is attached to vehicle brakes which may be, for example, the rear wheel brakes of an automobile. A rubber bumper 52 is attached to the bracket 10 so that the arm 42 engages it silently on release and is held against it due to tension forces exerted on the cable 50.

A pawl 54 is pivoted in a depression 56 formed on the arm 42 and has a tang 58 extending through an arm aperture 60 which limits the pawl's pivotal movement. A pawl spring 62 is attached to the tang 58 and to the arm 42 so that a pawl tooth 64 normally engages one of the teeth 66 of the ratchet 30. The arrangement of the pawl and the relationship of the parts thereof are also clearly shown in FIGURE 4.

In operation, as an operator desires to apply the brakes as herein described, a force is applied to a pedal 68 attached to the lever arm 42 to pivot the lever arm clockwise about the pivot 44 as shown in FIGURE 1. The pivoting lever arm 42 draws the pivot 48 upwardly, thereby moving the clevis 46 to further tension the cable 50. This also results in a movement of the pawl 54 in a clockwise direction, and its tooth 64 ratchets over the teeth 66 of the ratchet or geared segment 30. When the foot pressure is released, the tension in the cable 50 tends to move the lever arm 42 counterclockwise and tooth 64 thereby locks against one of the ratchet teeth 66. The pawl and ratchet or toothed segment are herein referred to as the locking means. In this manner, the parking brake mechanism herein described moves from a position, as illustrated in FIGURE 1, to a position as illustrated in FIGURE 2.

Referring now to FIGURE 4, when the operator desires to release the brake, he presses down on the knob 16 of rod assembly 14 and moves the rod assembly 14 downward, as viewed in FIGURE 4. This movement of the assembly 14 pivots the ratchet release 18 in a clockwise manner about the pivot rivet 20 against the force of the spring 38. This moves the tooth 22 into a space between the ratchet teeth 26 and 28. The cooperation of the teeth 22 and 24 with the teeth 26 and 28 can be equated to a cam and cam follower arrangement. The ratchet 30 will thereafter be forced to move counterclockwise about the pivot 32 until the tang 36 engages the upper side of the aperture 34. The pawl 54 will move slightly counterclockwise under the influence of the spring 62, but its tang 58 immediately engages the bottom of aperture 60 so that its tooth 64 is held out of engagement with the ratchet teeth 66. The tension in cable 50 then pulls the lever arm 42 counterclockwise about the pivot 44 and the lever arm finally engages the bumper 52 and reaches a position where it is poised for a future actuation. When the operator releases the knob 16, the spring 38 powers the ratchet release 18 counterclockwise so that its tooth 22 engages the ratchet tooth 26 to move the ratchet clockwise until the teeth 22 and 26 have an end engaging relation and the tang 36 is engaged by the bottom of the aperture 34. This also engages pawl tooth 64 with one of the ratchet teeth 66. The movement of release 18 is limited by engagement of release tooth 24 with ratchet teeth 28 and the ratchet engagement of its lower side of the aperture 34 with the tang 36. This cooperation of the ratchet release, the release rod and the teeth 26 and 28 of the geared segment is referred to herein as the unlocking means.

Therefore in summary, the operation of the subject device is controlled by the pivoting movement of the ratchet 30 around the point 32. The ratchet 30 is held in a position where it can be engaged by the tooth 64 of the pawl 54 by the spring 38 drawing the ratchet release 18 in a counterclockwise direction around the point 20 thereby keeping the tooth 24 of the ratchet release engaging the side of the tooth 28 of the ratchet. A release is thereafter effected by downward pressure on the knob 16 which pivots the ratchet release 18 around the pivot 20 in a counterclockwise direction bringing the tooth 22 of the ratchet release into engagement with a side of the mating tooth 28 of the ratchet 30. In this motion, the ratchet 30 is driven in a counterclockwise direction around the pivotal mounting at point 32 and down to a position where the tooth 64 of the pawl 54 cannot engage any of the teeth 66. This will allow the pedal arm 42 to be pulled in a counterclockwise direction due to the tension of the brakes through the cable 50. In this manner, the pedal arm 42 returns to a poised position, and a release of the knob 16 will result in it, too, being positioned in a poised position.

This invention has utility in any application where a great force, for example, of the type generated by a foot, is applied on a lever which will be thereafter held in an actuated position. It is also desirable to have a hand release lever which is remotely positioned from the foot to effect a release of the actuated mechanism in a positive manner. This set of circumstances is found in a parking brake and release mechanism therefor in a motor vehicle although it is understood that, any time the requirement for a foot operated hand release mechanism is had apart from an automobile, this invention will find utility.

While the embodiment of the present invention, as herein disclosed, constitutes a preferred form, it is to be understood that other forms might be adopted.

What is claimed is as follows:

1. Brake control mechanism for setting and releasing a vehicle parking brake, said mechanism comprising; a mounting bracket, actuating means pivotally supported by said mounting bracket for setting a vehicle parking brake, locking means including a pawl carried by said actuating means and ratchet means pivotally mounted on said mounting bracket, said locking means arranged to hold the actuating means in a set position by the cooperation of the pawl and ratchet means, and unlocking means including cooperating geared segments and a lever secured to one of said geared segments for pivoting the ratchet means in one direction to release the actuating means from a set position, said unlocking means having means for returning the ratchet means and the unlocking means to a poised position.

2. A brake control mechanism of the type defined in claim 1 wherein the last named means includes a spring disposed between the unlocking means and the mounting bracket.

3. Brake control mechanism for setting and releasing a vehicle parking brake, said mechanism comprising; a mounting bracket for attachment to a vehicle, a pivotable actuator lever supported by said mounting bracket and adapted to apply a vehicle brake, ratchet means including a drive portion and being pivotally supported on said mounting bracket, pawl means pivotally carried by said actuator lever and biased toward said ratchet means, and unlocking means including a drive cam and a lever pivotally carried by said mounting bracket, said ratchet means held in a poised position away from said pawl means by said unlocking means so as to be engageable with said actuator lever carried pawl means during a pivotal movement toward one extreme of movement thereby locking the parking brake in an applied position, said ratchet means adapted to be driven out of engagement with the pawl means by said drive cam in response to a pivotal movement of the unlocking lever thereby unlocking the parking brake from the applied position and returning said actuator lever to a poised position, said unlocking lever adapted to be returned to a poised position.

4. A brake control mechanism for engaging and releasing a vehicle parking brake, said mechanism comprising; a mounting bracket adapted to be supported on a portion of the vehicle, an actuator lever pivotally carried and suspended from said mounting bracket, said actuator lever including a clevis engaging a cable adapted to engage a plurality of vehicle brakes, a toothed segment pivoted on one end and mounted on said mounting bracket, said toothed segment having a cam follower portion on another end, pawl means pivotally carried by said actuator lever and adapted to engage said toothed segment, and unlocking means including a pivotally mounted cam, a lever secured to the cam, and a return spring, said cam arranged to operatively engage the cam follower portion of the toothed segment, said actuator lever adapted to be pivotally moved in one direction whereby the pawl means engages said toothed segment to provide a holding means therefor, said unlocking means lever adapted to move the cam pivotally thereby disengaging the toothed segment from the pawl means and allowing the actuator lever to return to a poised position, said unlocking means being brought to a poised position by said return spring.

5. A brake control mechanism for engaging and releasing a vehicle parking brake, said brake control mechanism comprising; a mounting bracket adapted to be secured to a stationary portion of the vehicle, a foot lever pendantly supported by the mounting bracket and adapted to pivot thereon, clevis means engaging said foot pedal at one extremity and a cable at another extremity; ratchet means including a toothed segment pivotally supported on said mounting bracket and a pawl pivotally supported on a portion of said foot lever, and unlocking means including a hand lever and a cam pivotally mounted on said mounting bracket and carrying said hand lever, said toothed segment having a depressed portion arranged to engage the cam for being pivotally moved, said foot pedal applying the rear wheel brakes when pivotally moved from a poised position toward one extreme of movement and carrying said pawl into engagement with a portion of the toothed segment thereby holding the foot pedal in any progressive stage of movement toward one extreme of pivotal movement, said toothed segment movable out of engagement with said pawl by pressure on said hand lever thereby releasing the foot pedal for pivotal movement toward an opposite extreme of movement to the poised position, thereby releasing of the foot pedal.

References Cited by the Examiner

UNITED STATES PATENTS

| | | | |
|---|---|---|---|
| 600,509 | 3/1898 | Brougham et al. | 74—96 X |
| 2,937,540 | 5/1960 | Claus | 74—534 X |
| 3,003,364 | 10/1961 | Hinsey | 74—529 X |

MILTON KAUFMAN, *Primary Examiner.*

BROUGHTON G. DURHAM, *Examiner.*